A. T. H. BROWER.
PRINTING PRESS.
APPLICATION FILED OCT. 25, 1905.

981,056.

Patented Jan. 10, 1911.
6 SHEETS—SHEET 4.

A. T. H. BROWER.
PRINTING PRESS.
APPLICATION FILED OCT. 25, 1905.

981,056.

Patented Jan. 10, 1911.
6 SHEETS—SHEET 6.

Witnesses:
N. G. Barrett
Lillian Prentice

Inventor:
A. T. H. Brower
by Prim T. Fisher
Attys.

UNITED STATES PATENT OFFICE.

ABRAHAM T. H. BROWER, OF CHICAGO, ILLINOIS.

PRINTING-PRESS.

981,056.  Specification of Letters Patent.  Patented Jan. 10, 1911.

Application filed October 25, 1905. Serial No. 284,277.

*To all whom it may concern:*

Be it known that I, ABRAHAM T. H. BROWER, a citizen of the United States, residing at Chicago, in the county of Cook and State of Illinois, have invented certain new and useful Improvements in Printing-Presses, of which I do declare the following to be a full, clear, and exact description, reference being had to the accompanying drawings, forming part of this specification.

The present invention has relation more particularly to that class of printing presses known as bed-and-cylinder presses, an early example of this type of printing press being set forth in Letters Patent No. 56,701, granted to Andrew Campbell July 31, 1866.

The main objects of the present invention are: First: to provide improved mechanism for effecting the reversal of the reciprocating type-carrying bed. Second: to provide an improved construction of gib or shoe for accurately guiding and holding down the bed in its reciprocating movements. Third: to provide means for adjustment of a bed-rack pinion shaft.

In the operation of the bed-and-cylinder presses of the Campbell type, it has been found that when the press is operated at a considerably high rate of speed, the difficulty of providing means for effectively reversing and checking the movement of the reciprocating bed has been a most serious one, because inasmuch as the idle or return movement of the bed occurred at a much higher rate of speed than the active or forward movement, no adequate means could be provided for controlling the momentum of the bed when running at the widely different speeds. My present invention affords a simple and effective means whereby the forward and return movements of the bed are rendered substantially uniform so that a single checking mechanism adapted for controlling the momentum of the bed may be employed. Again, in holding the bed in position upon its tracks or guide-ways, it has heretofore been the practice to provide two sets of adjustable shoes or gibs, one set serving to hold the bed down on its tracks or ways and the other set serving to insure its accurate straight line movement and to compensate for any wear or deviation in lateral direction. My present invention further contemplates providing gibs or shoes that will serve to adjustably hold the bed in position upon its tracks or ways and compensate for wear in either vertical or lateral direction. By the present invention also, provision is made whereby the bed-rack pinion shaft may, from time to time, be adjusted to compensate for wear so as to insure the accurate meshing of the pinions carried by the bed-rack pinion shaft with the racks engaging therewith.

Fig. 5ª is a detail view in section of a part illustrated in Fig. 5.

In the accompanying drawings A designates the main frame of the press from the sides of which rise suitable standards that sustain the impression cylinder B that is mounted upon a shaft B'. Upon one end of the impression cylinder shaft B' is keyed the bull-wheel C. This bull-wheel C is provided upon its inner face with two segmental racks C' and C², the rack C' facing outwardly and the rack C² facing inwardly, and these racks C' and C² are disposed at opposite sides of the cam blocks $d$ and $e$, whereby are formed respectively the cam grooves or guides D and E. The bull-wheel is provided also, as shown, with a continuous gear C³ with which will mesh the pinion of the main drive shaft, but as this forms no part of the present invention it need not be particularly described.

From side to side of the main frame (see Fig. 8) extends the bed-rack pinion shaft F that is preferably formed of sections connected together. This shaft F passes through and is sustained by eccentric bearing blocks $f$, $f'$ and $f^3$ that set within suitable housings $a'$, $a^2$ and $a^3$ in the center and sides of the main frame A. Each of the bearing blocks $f$, $f'$ and $f^3$ is provided with means, such for example as holes $f^2$ to receive a spanner-wrench, whereby it may be turned within its housing, and through each housing passes a set screw $a^4$ whereby the bearing blocks may be rigidly held after they have been adjusted. The shaft F has keyed thereto at its center the bed-rack pinion F' that engages with the rack $h$ upon the under side of the bed H and it will be readily seen that by adjusting the eccentric bearing blocks $f$, $f'$ and $f^3$, the bed-rack pinion F' may be raised to compensate for wear and thus insure the accurate engagement of the pinion F' with the bed-rack $h$, and to insure also the accurate meshing of the pinions on the end of shaft F with the bull-wheel racks.

Figure 12:
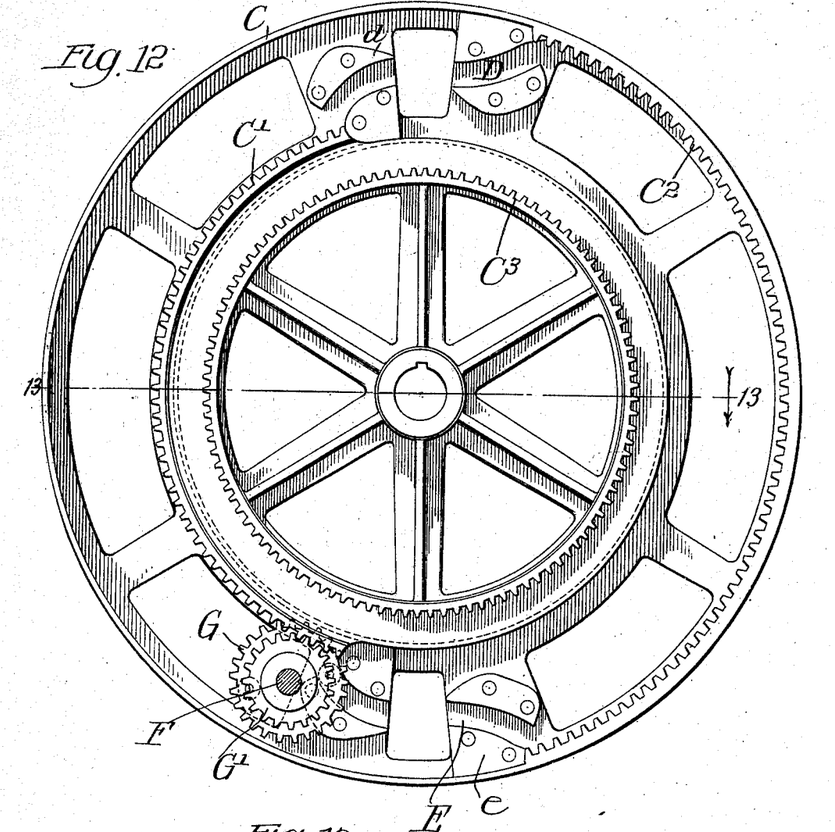
Fig.12 is a detail view in side elevation of the bull-wheel with the bed-rack pinion engaging therewith.
Figure 13:
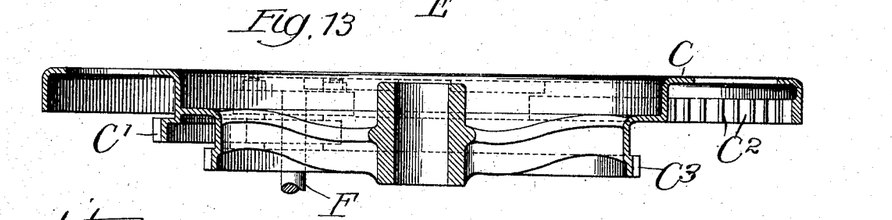
Fig. 13 is a view in cross section on line 13—13 of Fig. 12.

Upon one end of the bed-rack pinion shaft F are mounted the two pinions G and G', these pinions being preferably formed upon a common hub that is keyed to the shaft F. The pinion G is adapted to engage with the segment-rack C² of the bull-wheel, while the smaller pinion G' is adapted to engage with the segment-rack C' of the bull-wheel, as clearly shown in Figs. 12 and 14 of the drawings. From the outer face of the larger pinion G project the roll-carrying studs $g$ and $g'$ that will engage the cam blocks $d$ and $e$ of the bull-wheel and will pass through the cam grooves or guide-ways D and E in manner well understood by those familiar with this class of printing presses. By thus placing the segment racks C' and C² of the bull-wheel in different planes and by employing pinions of different size to engage with such racks, the movement transmitted from the bull-wheel to the bed through the medium of the pinions G and G', the bed-rack pinion shaft and the bed-rack pinion to the bed, will be substantially uniform in both directions; that is to say, the idle or return movement of the bed will be at the same rate of speed as the active or forward movement of the bed. Hence, it will be seen that under such condition a mechanism designed for checking the momentum of the bed will serve with equal effectiveness for checking such momentum in both movements of the bed.

Figure 14:
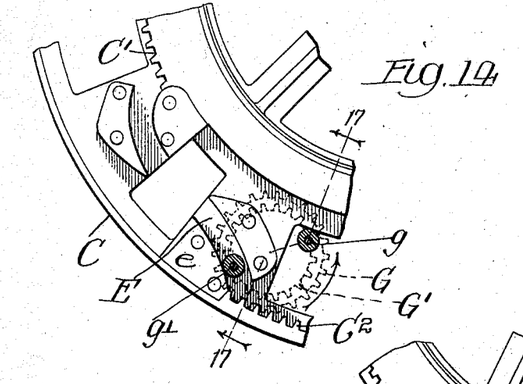
Figs. 14, 15 and 16 are detail views showing a portion of the bull-wheel with the studs of the bed-rack pinion engaging the cams of such wheel in different positions.
Figure 15:
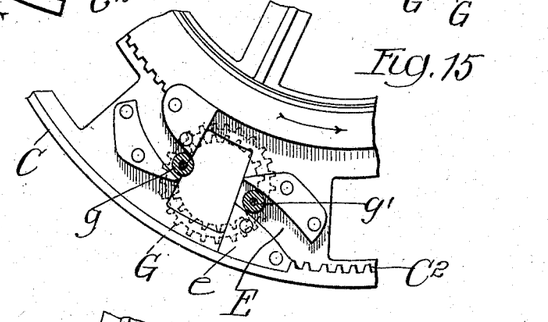
Figure 16:
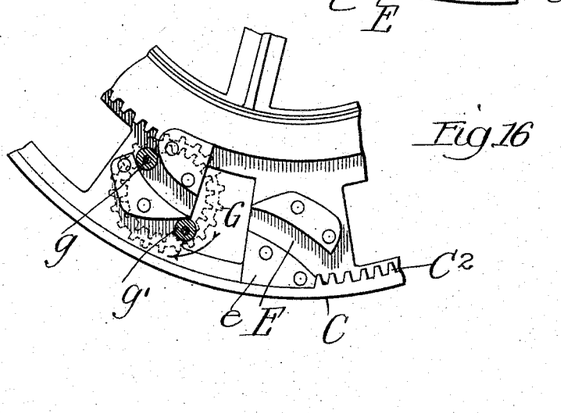
Figure 17:
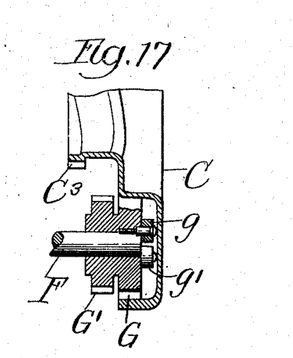
Fig. 17 is a view in vertical section on line 17—17 of Fig. 14.

The arrangement of the cam grooves D and E on the bull-wheel which coöperate with the rolls or studs $g$, $g'$ to check and effect the initial reversal of the bed-rack pinion shaft is well known and understood by those familiar with this class of presses. This operation is indicated in Figs. 14, 15 and 16 of the drawings. As there shown the roller or stud $g'$ enters the cam groove E as the rack C² is about to leave or be disengaged from the pinion G. When the rack C² is disengaged from the pinion the roll or stud $g$ also enters the cam groove E which is so shaped so as to arrest the movement of the pinions G and G' and of the bed-rack pinion shaft F. This arresting movement is completed when the parts reach the position shown in Fig. 15. The cam groove E is so shaped that, as the bull-wheel advances from the position shown in Fig. 15, the cam groove will act upon the roll or stud $g'$ to effect the initial reverse movement of the pinions and of the bed-rack pinion shaft just before the rack C' engages the pinion G', as indicated in Fig. 16. The operation of the cam groove D is of course similar to that of the cam groove E.

Figures 9, 10, 11:
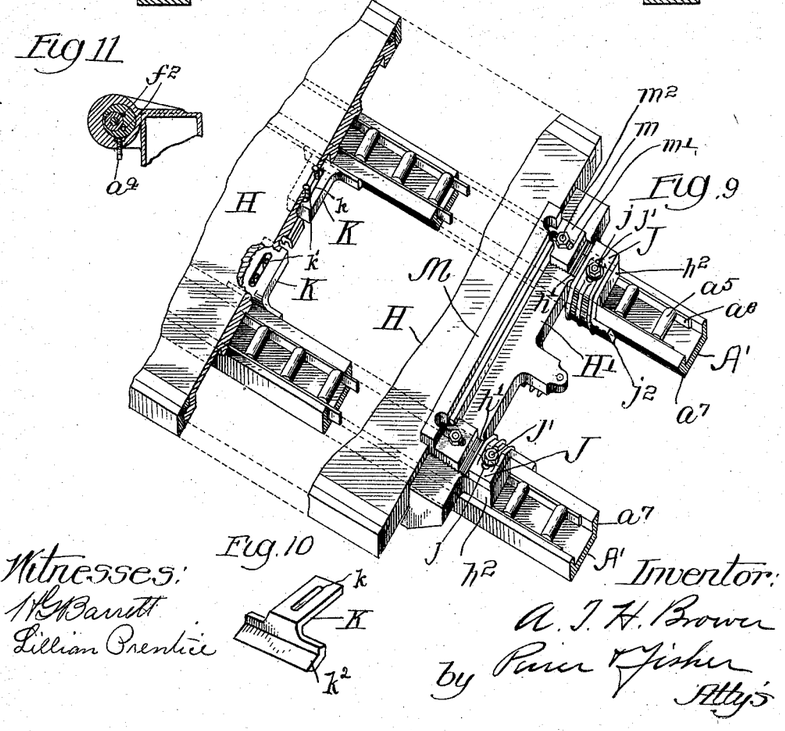
Fig. 9 is a perspective view showing a portion of the bed, its tracks or ways, the improved shoes or gibs for connecting the bed to its tracks or ways and the head clamp for holding the chase upon the bed.
Fig. 10 is a detail perspective view of one of the front gibs or shoes that hold the bed in position upon its tracks or ways.
Fig. 11 is a detail view in cross section showing the means for adjusting the bed-rack pinion shaft.

Upon suitable cross bars of the main frame A extend the longitudinal tracks or guideways A' that serve to sustain the bed H of the press. Preferably these guide-ways A' are grooved to receive groups or trains of anti-friction rolls $a^5$ that are preferably held at distances apart by bars $a^6$ wherein the axles of the rolls are journaled. In order to hold the bed H down upon the rolls $a^5$, and in order also to insure the true straight line reciprocation of the bed H, I have provided the improved construction of gibs or shoes that will next be described. As shown, there are two pairs of these gibs or shoes, the front pair J being preferably bolted to arms or extensions $h^2$ that project forwardly from one end of the bed H, while the rear pair of shoes K are bolted to the under side of the bed. The shoes J are formed each with a slot $j$ to receive the adjusting bolt $j'$ whereby the shoe may be held in different positions, and each of the shoes J is formed with a downwardly and inwardly extending inclined bearing face $j^2$ adapted to engage with the correspondingly inclined face $a^7$ of the rail or guide-way A'. Similarly the shoes K are formed with long slots $k$ to receive the bolts $k'$, whereby the shoes are adjustably bolted to the under side of the bed H, and these shoes K have downwardly and inwardly extending arms or portions with inclined bearing faces $k^2$ that engage the correspondingly inclined faces $a^7$ of the rails or guide-ways A'. Hence it will be seen that when the shoes J or K are adjusted, their beveled faces not only serve to hold the bed H down upon the anti-friction rolls $a^5$, but also serve to accurately hold the bed against movement in lateral direction. So far as I am aware the present invention presents the first instance in which this double function of guiding and holding down the bed has been accomplished by the same shoes.

In order to lock a type form in position upon the bed of the press, it has heretofore been proposed to provide at the end of the bed cam-blocks or like expedients for engaging the adjacent ends of the chase containing the type form. It frequently happens however, that owing to differences in the width of the chase the throw of the clamping blocks heretofore provided is insufficient and ineffective for retaining the form securely in position upon the bed. By my present invention I provide the forward end of the bed H with a clamp bar M extending transversely thereof, this bar being formed with feet $m$ having long slots $m'$ therein that receive the bolts $m^2$ whereby the feet are securely attached to the forward and the slightly lowered portion H' of the bed. In order to enable the clamping bar M to be firmly held in its adjusted position, the under side of the feet $m$ at the ends of the clamping bar are provided with transverse ribs, and corresponding ribs $h'$ are formed upon that portion of the bed H immediately beneath the feet $m$. Hence, it will be seen that by loosening the nuts of the adjusting bolts $m^2$, the clamping bar M can be moved forward or backward to the desired extent and when set in proper position can be securely held by means of the bolts $m^2$ and by the engagement of the feet $m$ with the correspondingly grooved portion $h'$ of the bed extension H'.

Figure 1:
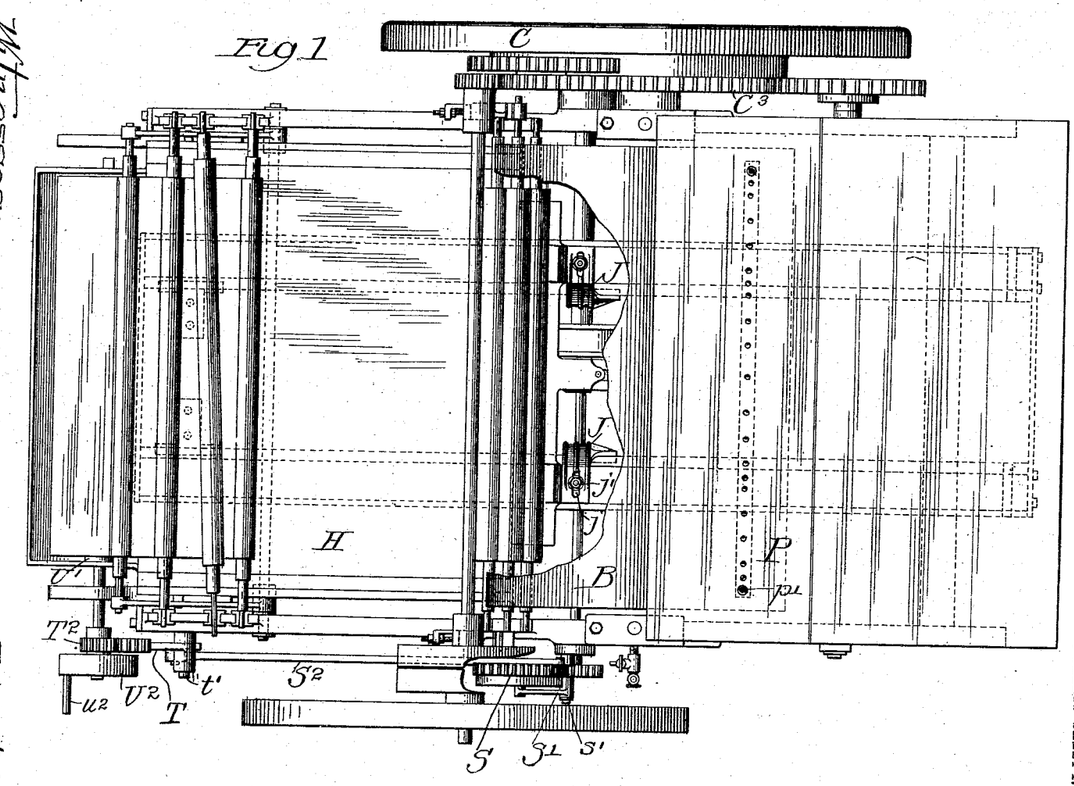
Figure 1 is a plan view of a printing press embodying my invention, parts being broken away for better illustration.
Figures 2, 3, 4:
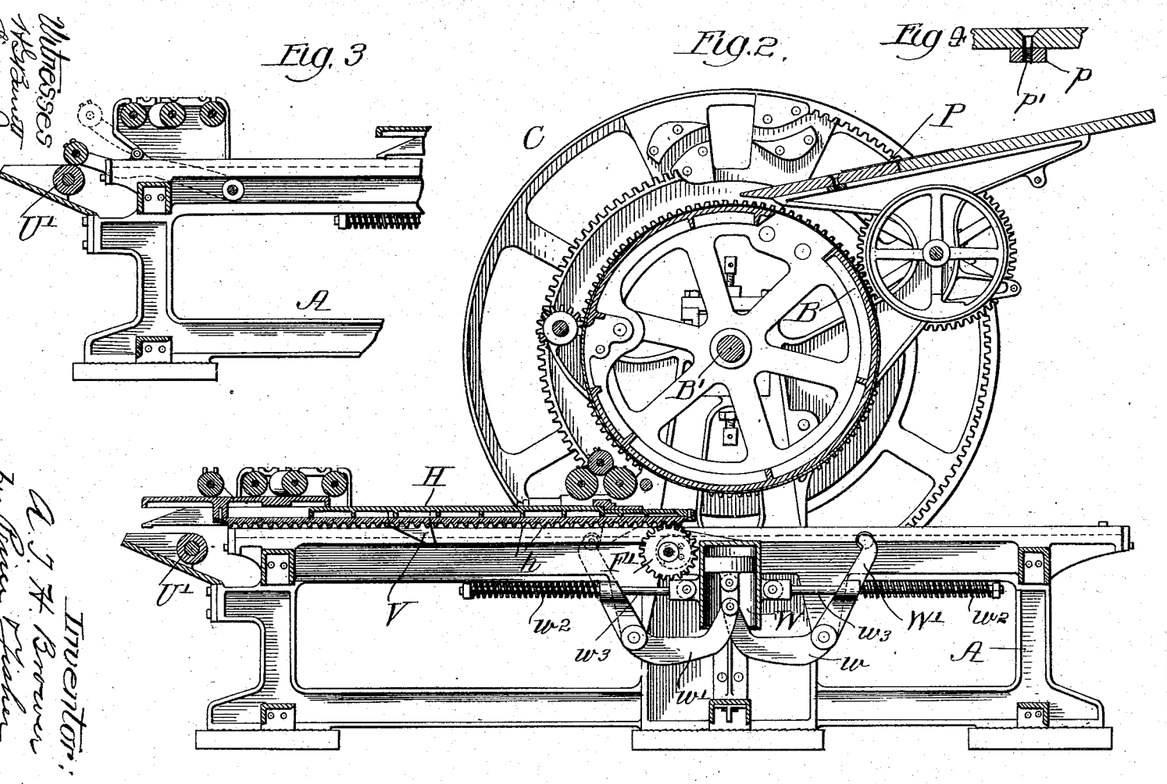
Fig. 2 is a view in central vertical longitudinal section.
Fig. 3 is a detail view in central vertical section through the inking roll mechanism at one end of the press.
Fig. 4 is a detail view in vertical section through a portion of the feed board having a feature of my invention applied thereto.

By reference to Figs. 1, 2 and 4 of the drawings, it will be seen that the feed board P of the press is provided upon its under side with a metal bar $p$ securely fastened thereto as by screws $p'$. In the feed board P are formed a transverse row of holes and in the bar $p$ are formed corresponding holes, these holes in the bar $p$ being screw-threaded to receive the screws whereby the side guide of the feed board P will be held in position. Heretofore, it has been customary simply to provide the feed board P with a transverse row of holes to receive the adjusting screw bolt of the side guides and to provide nuts upon the lower ends of these bolts. In practice it is found however, that such nuts are apt to work loose and not infrequently drop down into the press whereas by providing a threaded transverse bar beneath the feed board, the use of nuts for the adjusting bolts of the side guide is entirely avoided.

Figures 5, 5A, 6, 7:
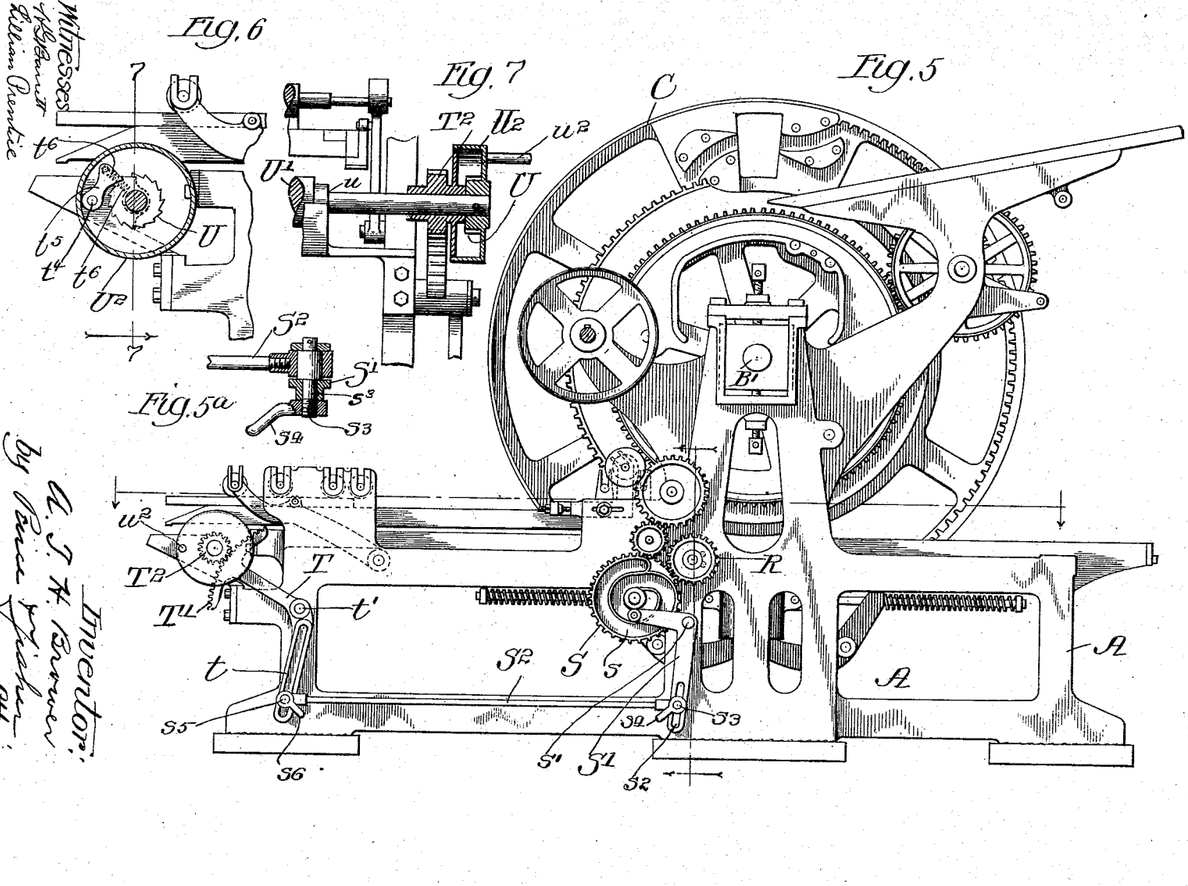
Fig. 5 is a view in side elevation of a press embodying my invention.
Fig. 6 is a detail view partly in elevation and partly in section showing the clutch mechanism whereby the ink ductor roll is driven.
Fig. 7 is a view in vertical section on line 7—7 of Fig. 6.

In order to enable the pressman to give to the ink fountain-roller a proper extent of movement corresponding to the character of the work for which the press is being used, I have provided the improved mechanism hereinafter described and more particularly illustrated in Figs. 1, 6 and 7 of the drawings. Upon one end of the bed-rack pinion shaft F is mounted the pinion R that meshes with the gear wheel S, the shaft of which is suitably journaled in the main frame of the machine. This gear wheel S has its outer face formed with a cam groove $s$ in which travels a roller bearing stud that projects laterally from the upper arm of an elbow lever S' that is pivoted as at $s'$ at one side of the main frame. The elbow lever S' is formed with a long slot $s^2$ adapted to receive an adjusting bolt $s^3$ having a washer (or head) at one end and having a threaded nut provided with a handle $s^4$, and this bolt $s^3$ passes through a hole formed in the end of a rod or pitman $S^2$, which by means of the bolt $s^3$ and nut $s^4$ is thus adjustably connected to the lower arm of the elbow lever S'. That part of the bolt $s^3$ that passes through the pitman $S^2$ is shouldered where it bears against the lever S', so as to allow the pivotal movement of the pitman on the bolt. The opposite end of the rod or pitman $S^2$ has a hole or coupling through which passes a bolt $s^5$ (similar to bolt $s^3$) that carries a threaded nut having a handle $s^6$, the bolt $s^5$ passing through a long slot $t$ formed in the lower end of an elbow lever T that is pivotally mounted upon a stud $t'$ projecting from the side of the main frame A of the machine. The upper arm of the elbow lever T is provided with a segment-rack T' that engages with the pinion $T^2$ that is loosely mounted upon the shaft of the ink fountain-roller U'. From the hub of the pinion $T^2$ projects a plate or arm carrying a stud $t^4$ whereon is pivotally mounted a pawl $t^5$, the free end of which engages a ratchet wheel U that is keyed to the shaft $u$ of the fountain roller U'. A spring $t^6$ serves to hold the pawl $t^5$ in engagement with the teeth of the ratchet wheel U. Preferably the ratchet wheel is formed with a casing $U^2$ from which projects a handle $u^2$ whereby the ratchet wheel and fountain roller U' may be turned by hand when required.

From the foregoing description it will be seen that by varying the points of connection of the ends of the rod or pitman $S^2$ to the elbow levers S' and T, the throw of the segment-rack T' can be varied and hence a corresponding extent of partial revolution may be given to the ink fountain-roller U'. It will be understood of course, that inasmuch as the pinion $T^2$ is loosely mounted upon the shaft $u$ of the fountain-roller, this roller will be turned in one direction only, and by the forward movement of the pawl $t^5$, this pawl, during its backward movement rides freely over the teeth of the ratchet wheel U.

Figure 8:
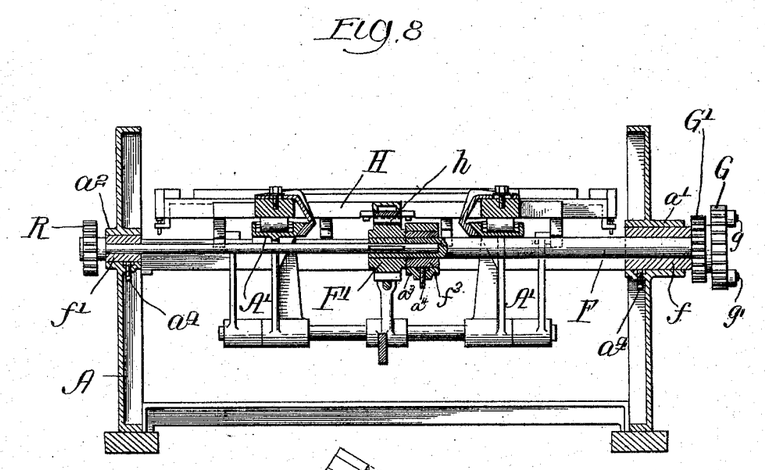
Fig. 8 is a view in vertical cross section upon the line adjacent the bed-rack pinion shaft, parts being shown in elevation.

I have shown, more particularly in Figs. 2, 5 and 8 of the drawings, the preferred mechanism for checking the movement of the bed H at the ends of travel in opposite directions, this preferred mechanism comprising an air cylinder W having a piston therein that is connected to check levers $w$ and $w'$ secured upon shafts below the top of the main frame, these shafts having fixed thereto contact arms W' that are engaged by stops V depending from the under side of the bed H; and the levers $w$ and $w'$ are shown as engaged by springs $w^2$ carried upon rods $w^3$ that pass through the upper ends of the levers $w$ and $w'$. Inasmuch however, as this last described mechanism for checking the movement of the bed H forms no part of my invention, I do not deem it necessary to illustrate or describe it more fully.

It will be readily understood that the precise details of construction above set out may be varied without departure from the scope of the invention and that features of the invention may be employed without its adoption in entirety.

Having thus described my invention, what I claim as new, and desire to secure by Letters Patent, is:—

1. In a bed and cylinder printing press, the combination with a bed-rack pinion shaft, of two pinions whereby said shaft is driven, a bull-wheel having segment racks for respectively engaging said pinions to drive said bed-rack pinion shaft in opposite directions, said bull-wheel having reversing cams between the ends of said racks and means engaged by said cams and connected to said shaft for reversing the direction of rotation thereof.

2. In a bed and cylinder printing press, the combination with a bed-rack pinion shaft, of two pinions of different diameters whereby said shaft is driven, a bull-wheel having internal and external segment racks arranged to alternately engage said pinions to drive said shaft in opposite directions at substantially uniform speed, said bull-wheel having reversing cams between the ends of said racks and means connected to said shaft and arranged to be engaged by said reversing cams.

3. In a bed and cylinder printing press, the combination with a cylinder arranged to continuously rotate in one direction and a reciprocating bed, of two pinions of different diameters for driving said bed, a bull-wheel fixed to said cylinder and having internal and external segment racks arranged at different distances from the center thereof and in offset relation to alternately and respectively engage said pinions to drive said bed in opposite directions, said bull-wheel having reversing cams between the ends of said racks and means connected to said pinions and arranged to be engaged by said reversing cams.

4. In a bed and cylinder printing press, the combination with a cylinder arranged to rotate continuously in one direction and a reciprocating bed, of a bed-rack pinion shaft geared to said bed, two pinions of different diameters fixed to said shaft, a bull-wheel fixed to said cylinder and having internal and external segment racks arranged at different distances from its center and in offset relation to alternately and respectively engage said pinions to drive said bed in opposite directions at substantially uniform speed, said bull-wheel having reversing cams arranged between the ends of said racks and said shaft having eccentric pins arranged to be engaged by said cams.

5. In a printing press, the combination with a reciprocating bed, of tracks whereon said bed is mounted, said tracks having inclined bearing faces, shoes adjustably secured to the upper face of said bed and having downwardly extending, inclined portions engaging the inclined bearing faces of said tracks.

6. In a printing press, the combination with a cylinder and a reciprocating bed having a rack on its lower side, of a bed rack pinion shaft extending beneath said bed and having a pinion meshing with said rack, a bull wheel on said cylinder having an outer internal and an inner external segment rack, pinions on said shaft arranged to be engaged respectively by said segment racks, a plurality of bearings in which said shaft is eccentrically journaled, housings fixed to the frame of the machine in which said bearings are rotatably adjustable, and means for holding said bearings in adjusted position, substantially as described.

7. In a printing press, the combination with a reciprocating bed and with a revoluble cylinder, of a shaft geared to said bed, a pair of pinions of different diameters on said shaft, a bull wheel connected to said cylinder and having internal and external segment racks arranged to respectively engage said pinions to drive said shaft and bed in opposite directions at substantially uniform rates of speed, and means for checking and reversing the movements of said shaft and bed, substantially as described.

8. In a printing press, the combination with a bed rack pinion shaft, of adjustable eccentric bearings for said shaft, said eccentric bearings being provided with holes to receive a spanner wrench and means for holding said eccentric bearings in adjusted position.

9. In a printing press, the combination with a reciprocating bed and with a revoluble cylinder, of a shaft geared to said bed, a pair of pinions of different diameters fixed on said shaft, a bull wheel connected to said cylinder and having an outer internal and an inner external segment rack arranged to respectively engage said pinions to drive said shaft and bed in opposite directions at substantially uniform rates of speed, said bull wheel having reversing cams and said shaft having eccentric pins arranged to be engaged by said reversing cams, and means for checking said bed at the opposite ends of its movement, substantially as described.

ABRAHAM T. H. BROWER.

Witnesses:
  LILLIAN PRENTICE,
  KATHARINE GERLACH.